Jan. 29, 1946. G. KEINATH 2,393,639
LINE-FOR-LINE RECORDER
Filed March 23, 1944 3 Sheets-Sheet 2

INVENTOR.
George Keinath.
BY
Curt M. Avery

Jan. 29, 1946.　　　G. KEINATH　　　2,393,639
LINE-FOR-LINE RECORDER
Filed March 23, 1944　　　3 Sheets-Sheet 3
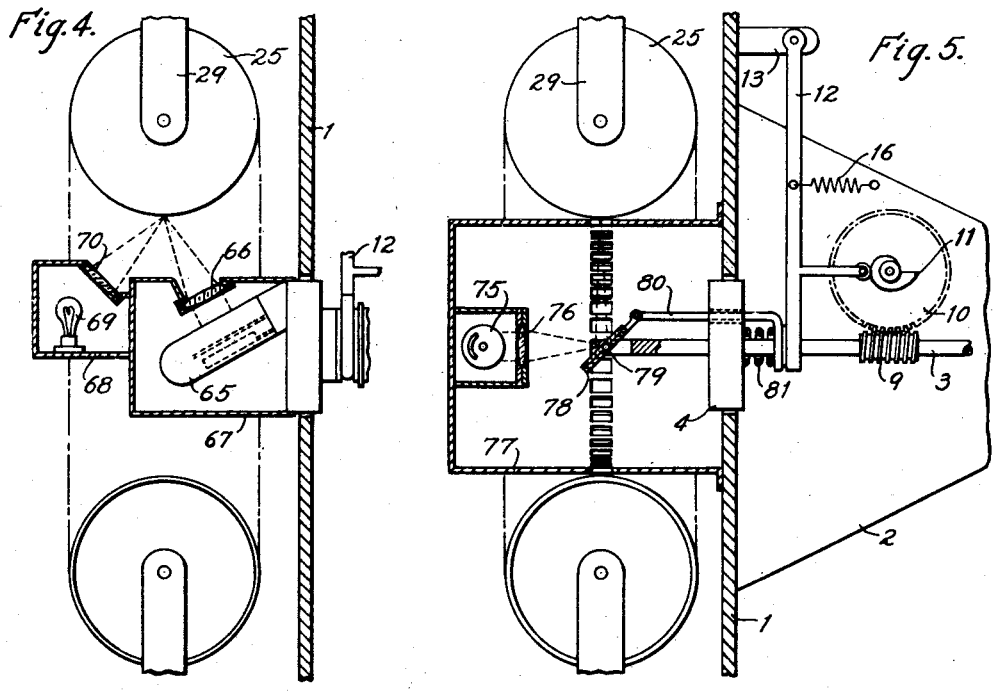
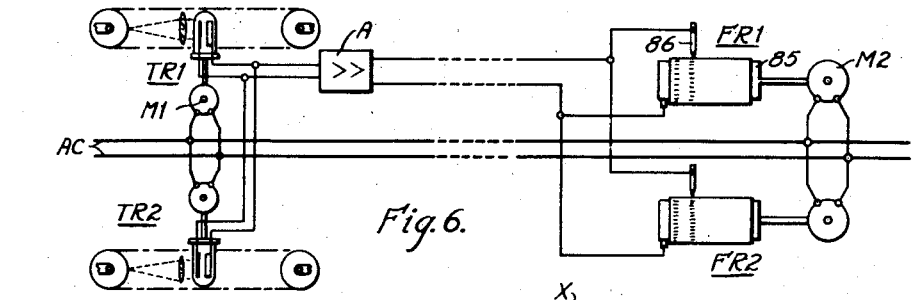
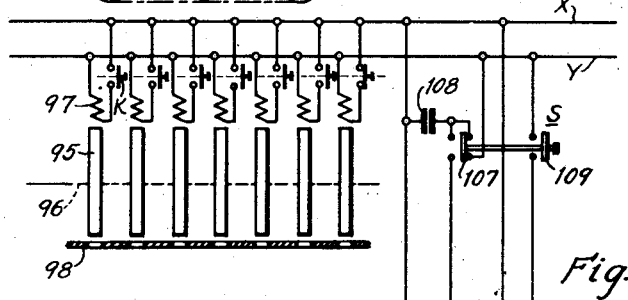
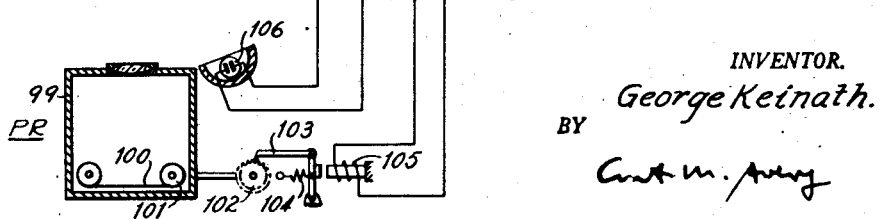
INVENTOR.
George Keinath.
BY Patented Jan. 29, 1946

2,393,639

UNITED STATES PATENT OFFICE 2,393,639

LINE-FOR-LINE RECORDER

George Keinath, Larchmont, N. Y.

Application March 23, 1944, Serial No. 527,773

12 Claims. (Cl. 178—6.6)

My invention is related to that of the copending application Serial No. 527,774, for Methods and means of recording indications, filed March 23, 1944, by George Keinath and Reinhard K. Hellmann, and concerns electric systems and apparatus for recording a group of letters, figures or other symbols indicative of relay positions, operating conditions, or other data.

It is a general object of my invention to provide means which permit a quick repeating of a recording operation of the whole group of symbols whenever one or several of its individual symbols have been changed so that the repeated record represents the new status of the complete data conveyed by that group. Devices of this type are applicable for transmitting or recording the operative condition of relays or switches in power plants or distribution systems, indicating prices of stocks or commodities, reporting data concerning the operation or output of manufacturing plants, transmitting election returns, supervising the operation of railroads or operating conditions of public carriers in general, or recording the indication of billboards in flight centers, for example.

A more specific object of my invention is to provide such transmitter or recorder system of the type referred to that affords an increased operating speed as compared with the systems heretofore available. More particularly, it is aimed at decreasing the time required for completing each individual recording of a group of symbols after a change has occurred as regards any of the symbols appertaining to that group. This object will be appreciated by considering the conditions prevailing in a concrete example of application of such a system. As such an example the requirements of a recording apparatus for flight centers are discussed in the following, although it will be understood that the invention is likewise of advantage for other uses of the kind above mentioned.

In a flight center, messages from airplanes in flight concerning flight conditions are continually received and orders to such planes are continually issued, and these data are manually transferred to a large billboard, each line of the board representing the data for one airplane at a certain time, such as altitude, speed, location or time of arrival. Each line is composed of numerous symbols, for instance, up to 32 letters and figures. Whenever a change occurs in such a line, the whole line is recorded on paper in order to have a permanent record. At present, this is done with tele-typewriters which have a speed of about 5 letters per second so that about six seconds are needed for recording each changed line. This is rather slow in cases where the indications change in rapid succession. Hence, it is aimed by the present invention at reducing the operating time, for instance, to as little as about one second.

It is another object of my invention to provide a fast-operating recording system of the type above-referred to that permits transmitting the record to one or many remote receivers.

Still another object of the invention is to design a line-for-line recording system whose record is condensed to minimum space so that a very large number of notations can be stored in extremely little filing space, this being especially favorable in cases where the record is needed only for occasional reference purposes.

In order to achieve these ends, and in accordance with a feature of the invention, I provide an image-producing recorder capable of recording an image of a complete group or line of data at a time, and this recorder is controlled to operate upon each completion of a change in the line of data.

According to another feature of the invention, the indications are transmitted to a tableau, small board or the like auxiliary device of the data to be recorded and each change in these data is reproduced on the auxiliary device, whereafter each changed line of the device is recorded by the image producing recorder. Due to the fact, that the recording operation proper is either virtually instantaneous or completed within a fraction of a second and that the time needed for making a change in a line or group of symbols, often limited to a change of only one or a few symbols, is usually much shorter than that needed for retyping the entire line, the total operating time is considerably reduced.

These and other objects and features of the invention will be apparent from the following description of the embodiments exemplified by the drawings in which Figure 1 represents a circuit diagram of the electric control connections of a recording system according to the invention together with an appertaining photo-electric indicating device, the latter being shown in a partly sectional view, Fig. 2 is a partly sectional front view of the same indicating device;

Fig. 4 represents, by a partial view, a modified form of an indicating device of a system otherwise similar to that of Figs. 1 and 2;

Fig. 5 represents still another modification of such a device;

Fig. 6 is a schematic illustration of a similar system designed for remote recording; and Fig. 7 represents diagrammatically another example of the invention including a photographic recorder.

Figure 1:
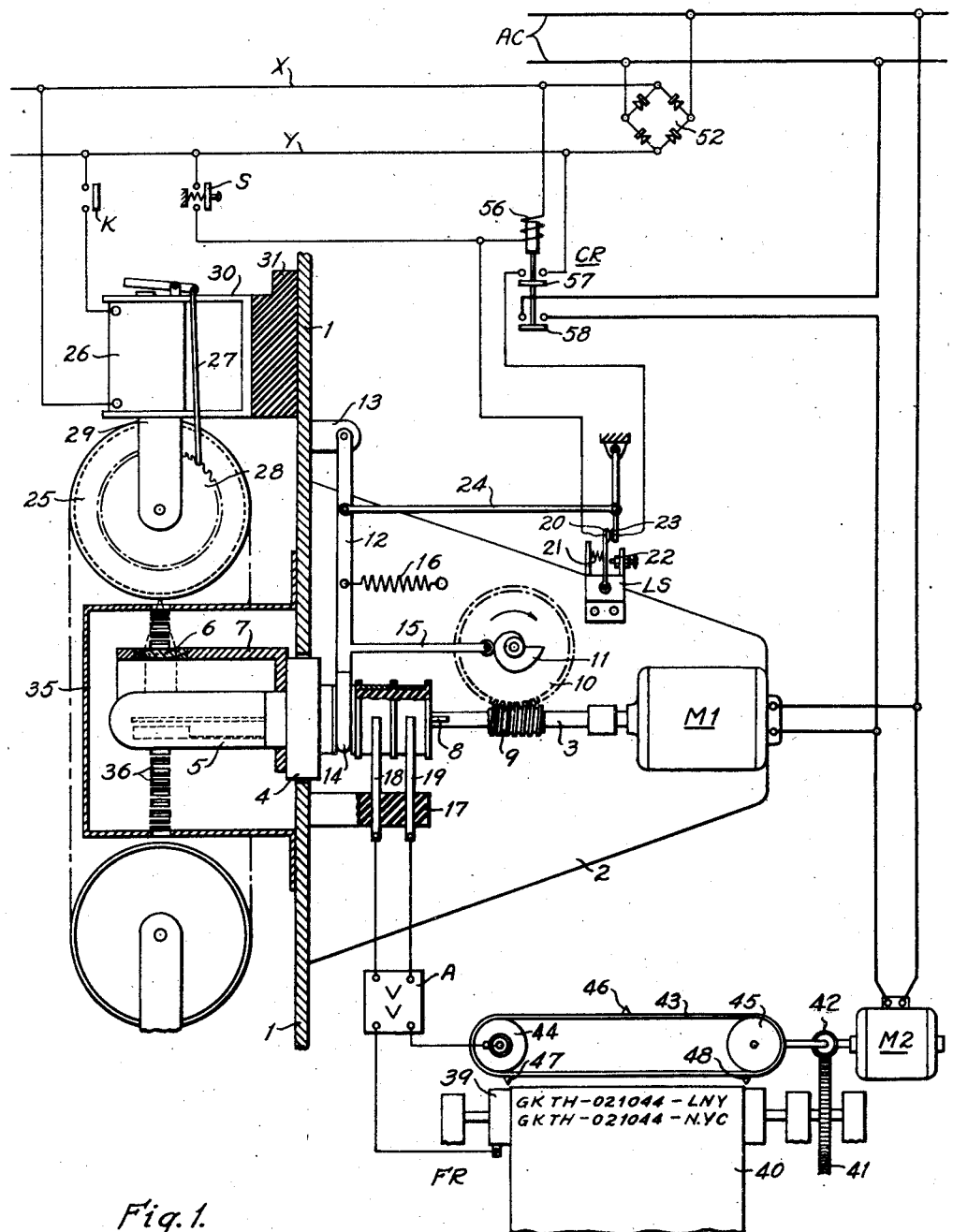
Figure 2:
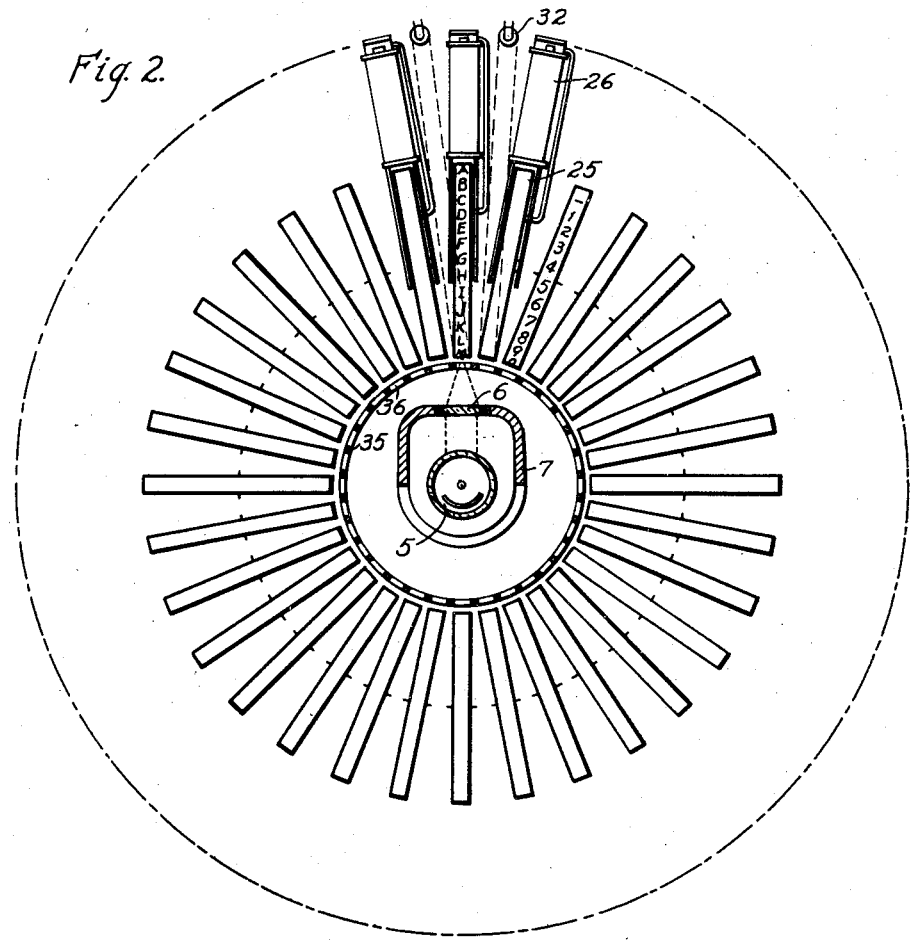

Referring to Figs. 1 and 2, the frame structure of an indicating or transmitting device has a base plate 1 provided with a rearwardly extending portion 2 which carries an alternating current motor M1 whose shaft 3 serves to drive a rotary base member 4 provided with a photocell 5. A lens 6 is mounted, in front of the light responsive surface electrode of the cell 5, on a holder 7 attached to the base member 4 in order to focus the cell onto a scanning point. The base member 4 and the photo-electric scanning devices are axially displaceable relative to the shaft 3 but prevented by a feather 8 from relative rotation. A worm 9 on shaft 3, meshing with a gear 10, rotates a cam 11 once for each given number of revolutions, for instance ten, of the shaft 3. The shaft of cam 11 is journalled in the frame portion 2. A lever 12, pivoted at 13 to the base plate 1, engages with its end 14 a groove of the base member 4 and has a lateral arm 15 provided with a roller which engages the cam 11 under bias by an extension spring 16. The curve of cam 11 is spiral shaped so that the cam radius changes in proportion to the angle of rotation. As a result, the lever 12 and the base member 4 are axially displaced at a uniform speed during a cycle of ten rotations of the motor shaft. Thereafter, the base member drops back into its initial position to be ready for a new cycle of motion.

An insulating holder 17 mounted on the base plate 1 carries two brush contacts 18 and 19 which engage corresponding slip rings of the base member 4 for connecting the photocell 5 with the input terminals of an amplifier A. The slip rings are of sufficient axial width to maintain the electric connection during the entire cycle of axial motion.

A limit switch LS is mounted on the frame portion 2. The movable contact 20 of this switch is biased by a spring 21 toward a stop 22 and engages another movable switch contact 23. Contact 23 is linked to the lever 12 by a rod 24 so that the contact engagement is opened only at the beginning of a cycle of axial motion when the contact 20 rests against the stop 22 but is closed immediately after a cycle has been started and remains closed until the cycle is completed.

A number of symbol-carrying indicator members, hereinafter called "symbol wheels" are rotatably mounted on the base plate 1. In the illustrated embodiment 32 symbol wheels are arranged in a circular group so that the plane of rotation of each extends radially with respect to the group. The peripheral cylindric wheel surfaces are each provided with a row of different symbols such as letters or figures and the like characters. Each wheel is controlled by an electromagnet 26 whose armature actuates a pawl 27 for driving a ratchet gear 28 connected with the wheel 25. The wheel shafts are mounted on arms 29 firmly attached to the frame structure 30 of the magnet. An insulating body 31 connects the structure 30 to the base plate 1. Each energizing impulse supplied to the magnet 26 causes the pawl to advance the symbol wheel 25 one step. Hence, any of the symbols of the wheel can be adjusted to a given position by transmitting a corresponding number of impulses to the magnet.

The photocell 5 and lens 6 are covered by an opaque closure 35 which has a number of openings 36 in alignment with one another and so positioned as to be in front of the respective symbols along the innermost periphery of the circular group of symbol wheels. When the photocell is rotated by the motor M1, the scanning point travels first along the right-hand side of the openings 36 while being gradually displaced towards the left (with reference to the showing of Fig. 1). Consequently, the entire surface area of the ring of openings and the line of symbols appearing behind them are scanned during the cycle of the above-mentioned ten revolutions.

A facsimile recorder FR has its recording means electrically connected with the output terminals of the amplifier A to be energized in accordance with the impulses issuing from the above-described scanning transmitter. Various types of facsimiles recorders, known for picture transmission, can be used for the purpose of the invention by adapting the transmitter to an intermittent line-for-line operation. In the illustrated example, such adaptation is achieved in the following manner. The member or drum 39 for accommodating a recording strip 40 of electrolytic paper is driven by a gear 41 meshing with a worm 42 which, in turn, is operated by an alternating current motor M2 to operate the strip transport in synchronism with the axial displacement of the photo-electric scanning device of the transmitter. In other words, the advance of the paper strip is to be simultaneous with and proportional to the axial motion of the scanning point.

An endless flexible member 43, such as a sprocket chain, is guided by two rollers or sprockets 44 and 45 and carries three stylii 43, 44 and 45 spaced equally from each other so that one of them reaches the end of a line to be reproduced on the strip 40 while the next is about to start its travel over the strip. The shaft of roller 45 is driven by the motor M2 in synchronism with motor M1 and the rotary travel of the scanning point. Hence, the above-mentioned ten rotations of the scanning point correspond to ten individual passages of the stylii across strip 40. The stylus arrangement and the drum 39 are electrically connected to the output terminals of the amplifier A. As a result, the amplified impulses coming from the photocell, as it scans the circular line of symbols of the symbol wheels, are reproduced on the sheet 40 as a straight image of the same symbols.

While I have shown synchronous electrical drives, it will be understood that other synchronizing means may be used instead. For instance, the recorder FR may be mechanically connected to motor M1 so that a single motor suffices for actuating the system. An electrical synchronization, however, is preferable in cases where a remote transmission to one or several receivers is desired or when several scanning transmitters are used in connection with a single facsimile recorder.

An embodiment of electric circuit means for controlling the system according to Figs. 1 and 2 will now be described in detail.

According to Fig. 1, each electromagnet 26 of the indicating device is connected with the leads X and Y of a direct current circuit DC energized, for instance, from the above-mentioned alternating current line AC through a rectifier 52. A set of keys is provided for the respective symbols of each symbol wheel. The keys may be arranged in alphabetic or numerical order and are interlocked so that when one is depressed the one previously depressed is released. Each key causes a number of impulses to be transmitted to the magnet 26, thereby adjusting the appertaining wheel so as to place the symbol of the selected key behind the corresponding opening 36 of the cover 35. Since different types of such impulses transmitting control means are well known for telephone and telegraph circuits, they are represented in Figure 1 schematically by a single switch-type key K. A more detailed showing, exemplifying a suitable type selector, is given in Fig. 3 which will now be referred to before continuing the description of the control circuits of Figure 1.

Figure 3:
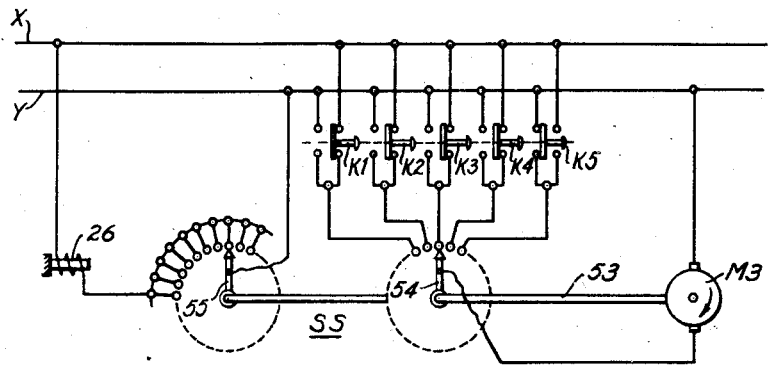
Fig. 3 shows diagrammatically a detail of the control circuits shown in Fig. 1.

According to Fig. 3, a series of symbol selector keys K1, K2, K3, etc., is connected with the respective contacts of a contact bank appertaining to a selector switch SS. Each key, when inoperative, attaches the appertaining bank contact to lead X of the direct current source and, when depressed, reverses the polarity of the contact by connecting it to lead Y. Key K5 is shown in the latter condition. The shaft 53 of the slide contact 54 of the just-mentioned bank is mechanically connected to a drive motor M3 which is electrically connected between the slider 54 and lead Y. Suppose key K1 had been depressed before key K5 was placed into the illustrated position thereby returning key K1 into the inoperative position, then the motor M3 will be running in the direction indicated by an arrow because the slider 54, engaging the bank contact of key K1, is now connected between leads Y and X. When passing over the successive bank contacts of keys K2, K3 and K4, the same motor connection is maintained so that the motor continues running until the slider 54 engages the bank contact of key K5. In this moment, both poles of the motor M3 are attached to lead Y and the motor is stopped and remains stopped until another key is depressed. Then, the motor is again operated in the same running direction until the slider 54 reaches the bank contact of the newly selected key.

The shaft 53 carries another slide contact 55 which is connected to lead Y and cooperates with a second bank of contacts. The contacts of this second bank are all series connected to the magnet 26 of the symbol wheel and designed to interrupt the circuit of magnet 26 each time the slider 55 passes from one to the next bank contact. As a result, a number of impulses is transmitted in accordance with the number of contact steps traversed by the slide contact 54 so that the symbol wheel is adjusted substantially in synchronism with the speed of motor M3 and in accordance with the selected symbol key. While this symbol adjusting device is shown mainly for completeness and as representing one of many available possibilities, a control of this general type has the advantage of a high operating speed, as compared, for instance, with dial switches.

Reverting now to Fig. 1, where the wheel adjusting control means are diagrammatically symbolized by the contact device K, another contact S, for instance a push button, is located close to the selector controls K of the symbol wheels so that it is actuated by the operator or automatically after the completion of a change in the line of symbols. During the short interval in which the push button S closes its contact, the coil 56 of a control relay CR is energized. It closes a self-sealing contact 57, thus preparing a holding circuit which is interrupted by the limit switch LS when the motor M1 is at rest and the scanning device in its starting position. A second contact 58 of relay R1 closes the energizing circuit of the motors M1 and M2 so that the motors start running. This causes the limit switch LS to close its contacts, as explained in the foregoing, before the push button S has opened its contact. Hence, when switch S opens, the relay coil 56 remains energized through the holding circuit X, 56, 26, 23, 57, Y so that the motors M1 and M2 continue their operation. After the completion of ten full turns, to revert to the above-chosen numerical example, lever 12 with follower 15 drops back toward the starting position of cam 11 and opens the limit switch LS so that both motors are stopped. The motors remain then at rest until the push button contact S is again depressed.

Once the contact S has been actuated, its further actuation has no effect on the control operation as long as the motor M1 has not completed a full cycle of operation. Upon such completion, however, a renewed actuation of contact S will immediately start a new cycle. If desired, the contact S may be actuated in regular intervals of time or whenever a repetition of the last recording of a line is needed.

The above-described scanning device requires a brightness of the wheel symbols sufficient for the photoelectric excitation of the cell 5. Therefore, a suitable illumination must be provided for. To this end, the symbols of the symbol wheel 25 according to Figs. 1 and 2 are transparent or translucent and are illuminated from within or through the wheel. Fig. 2 shows the arrangement of a small light bulb 32 for one of the symbol wheels, the others being similarly equipped. The bulb 32 is located at one side and above the axial plane of the magnet. The adjacent side of the appertaining symbol wheel is either transparent or has cut-out sections so that the light beam illuminates the symbol in registry with the scanning opening 36.

A modification of the scanning device, requiring only one light source for all symbol wheels, is shown in Fig. 4. According to this modification, the photocell 65 is in a slanted position relative to its axis of rotation and focused by the lens 66 onto a scanning point which is illuminated by a spotlight consisting of a lamp 69 and a focusing lens 70. The casing of lamp 69 is mounted on the casing 67 of the photocell. The symbols of wheel 25, in this modification, are opaque, for instance, black or white. In all other respects the apparatus is similar to that of Figures 1 and 2.

In the modification of the scanning device shown in Fig. 5, the photocell 75 and lens 76 are mounted on a cover 77 and remain stationary during the scanning operation. A mirror 78 serves to direct the scanning beam from the symbols to the cell. This mirror is pivoted about a shaft 79 which is secured to the base member 4 and extends transverse to the axis of rotation of the member 4 and its driving shaft 3. A link 80, biased by a spring 81 toward engagement with the lever 12, imparts a reciprocatory motion to the mirror 78 in accordance with the cam controlled motion of the lever. As a result, the scanning point moves through a spiral path in the same manner as explained with reference to Figs. 1 and 2. The illuminating means may be designed as described above and are not shown in Fig. 5.

The operating speed of the known facsimile recorders for transmitting pictures or complete sheets of newspapers or manuscripts is relatively slow due to the start-stop method used for synchronizing the receiver with the transmitter. Generally not more than two revolutions per second are customary. In systems according to the invention, as described above, a much greater speed is applicable without difficulty because the receiver drum rotates continuously throughout an entire cycle of operation and need not be accelerated and stopped between individual revolutions. A scanning time of, for instance, about two to three milliseconds for each symbol is usually sufficient so that a line of, for instance, 32 symbols can be traversed during a single revolution within about 60 to 90 milliseconds at a greater time accuracy than the minimum needed for obtaining a clear recording. Operating with ten revolutions per cycle, for instance, the total scanning time for a complete line of symbols amounts to less than one second and, if desired, can be speeded up to require only a fraction of a second.

The above-described systems are readily applicable for a remote transmission of the record to one or several receivers. Fig. 6 shows a diagram of such an application. Two transmitters TR1 and TR2, each containing an impulse transmitting scanning device having symbol wheels, a photocell 5 and a motor M1 for rotating and reciprocating the scanning point as explained in conjunction with the foregoing embodiments, are connected to an amplifier A whose output current is transmitted to one or several facsimile recorders such as those denoted by FR1 and FR2. Each recorder has a drive motor M2 synchronized with the transmitter motors M1 and moves a recorder drum 85 and a stylus 86 relative to each other so as to produce a spiral motion similar to that of the scanning point in the transmitter. A cam disc of the type shown in Figs. 2 and 5 may be used for this purpose. The drum 85 is covered by a recording sheet. The receiver operation is similar to that of the receivers known for picture transmission. The transmitters TR1 and TR2 are interlocked so that only one can operate at a time. When in operation, the same records are produced simultaneously in both receivers FR1 and FR2.

While the embodiments so far described involve a photoelectric method, other image producing methods are also applicable for the purpose of the invention. For instance, a contact brush driven in substantially the same manner as the photoelectric devices mentioned in the foregoing may be used for scanning conductive symbol surfaces mounted on an insulating surface of the symbol wheels. A photographic image reproduction is likewise applicable and has the advantage of permitting a further increase in operating speed.

A recording system of the latter type is represented by Figure 7. A number of symbol wheels 95 are mounted for rotation about a common rectilinear axis 96 and driven by respective magnetic drives 97 designed and operative in accordance with the magnets 26 in Figs. 1 and 2. Each magnet 97 is connected to the mains X and Y of an energizing line through control devices, here schematically represented by a key K, in a manner similar to the preceding examples of the invention. A partition 98 covers the symbol wheels towards a photographic recorder PR and has windows behind which the selected symbols appear.

The recorder PR consists of a camera 99 so located as to take a picture of a single complete line of symbols at a time. A photographic recording strip 100 extends between two spools of which the one denoted by 101 is connected to a transport mechanism. This mechanism has a ratchet gear 102 and a pawl 103 biased by a spring 104 and controlled by an electromagnet 105. When the magnet is energized, the pawl is lifted in opposition to the spring. Upon deenergization of the magnet, the spring 104 returns the pawl into its original position and thereby causes it to entrain the ratchet gear 102. In this manner the strip 100 is advanced one step after the cessation of each control impulse supplied to the magnet.

An illuminating device 106 such as a gaseous discharge lamp or spark gap is provided for illuminating the line of symbols by a timed flash of short duration.

A control switch S with two contacts 107 and 109 is arranged near the keys K of the wheel adjusting control means and may consist of a push button comparable to that denoted by S in Fig. 1. Contact 107 connects a condenser 108 across the mains X and Y as long as the switch S is inoperative. Hence, the condenser 108 is charged during successive actuations of the switch. After the completion of a change in the line of symbols, the operator actuates the switch S and thereby connects the condenser 108 temporarily across the lamp 106 causing it to flash and to expose the strip 100. Thus an image of the complete line is produced virtually instantaneously. At the same time, the contact 109 connects the magnet 105 across X and Y. When switch S is released, i. e., after the illumination has flashed, the magnet becomes deenergized so that the strip 100 is advanced and then ready for the next recording operation.

The operating speed of such a device is extremely high even in comparison with the other embodiments described previously. The photographic system permits also any desired reduction or enlargement of the recorded image as compared with the size of the symbols on the symbol wheels. When using reduced records, a very large amount of notations can be stored within small space, although a subsequent enlargement may be needed when studying the record.

What I claim is:

1. Apparatus for recording indications composed of a multiplicity of symbols, comprising a supporting structure, manually controllable exhibiting means disposed on said structure for producing a copy of the indication to be recorded and including a circular group of indicating devices each having selective symbol means operative to place a selected symbol into a given reference position sequentially arranged on a circle with the positions of said other devices so that the simultaneously selected symbols form together a single composite notation, a recorder having a recording sheet and drive means for advancing said sheet, scanning means mounted on said structure within said circle and connected with said recorder for causing it to record an image of said notation, and manually controllable start-stop means for controlling said recorder and scanning means so as to record a single image of a complete notation for each actuation of said exhibiting means.

2. Apparatus for recording indications composed of a multiplicity of symbols, comprising manually controllable exhibiting means disposed for producing a copy of the indication to be recorded and including a group of juxtaposed indicating devices each being provided with a series of different symbols and being operative to place a selected symbol into a given reference position, said devices being located one aside the other in a substantially circular group so that said reference positions are adjacent to one another along a substantially circular line, a recorder having means for accommodating a recording sheet and means for producing thereon an image of the totality of symbols located in said positions at a time, control means for operating said recorder intermittently in order to produce a single image at a time, intermittent drive means forming part of said recorder for advancing said sheet, and means controlling said drive means in dependence upon the operation of said exhibiting means.

3. Apparatus for recording indications composed of a multiplicity of symbols, comprising exhibiting means disposed for producing a copy of the indication to be recorded and including a circular group of rotatable indicating members each having a group of symbols on its peripheral surface and drive means for selectively adjusting the rotary position of each member independently of said other members, a substantially cylindric partition positioned concentrically within said circular group and having aligned openings in front of said members respectively so that, at a time, only one of the symbols of each member is behind the appertaining opening, recording apparatus having means for accommodating a recording sheet, and scanning means disposed substantially on the axis of said cylindric partition and connected to said recording apparatus for causing it to produce on said sheet an image of the symbols simultaneously located behind said openings, and intermittent control means for actuating said scanning means and recording apparatus to produce the image of a complete single line of symbols during each actuation.

4. A recording system comprising, in combination, a substantially circular group of symbol wheels each carrying a row of different symbols on its peripheral surface and extending substantially radially to said group, an electromagnetic mechanism associated with each of said wheels for adjusting it to a selected angular position, electric impulse transmitting scanning means positioned centrally of said group, drive means connected with said scanning means for rotating and axially displacing them relatively to said group so as to cause said device to scan the adjacent circular line of symbols during a given number of rotations, and synchronous recording means of the facsimile recorder type connected with said scanning means for producing an image of said line of symbols.

5. A recording system comprising, in combination, a substantially circular group of symbol wheels each carrying a row of different symbols on its peripheral cylinder surface and extending substantially radially to said group, an electromagnetic mechanism associated with each of said wheels for adjusting it to a selected angular position, a photo-electric scanning device having a scanning point focused on a circular line of symbols along an inner periphery of said group of wheels and containing drive means for rotating and axially displacing said point so as to scan said line during a given number of rotations, and a facsimile recorder synchronized with said drive and controlled by said scanning device for producing a record of the symbols of said line.

6. A recording system comprising, in combination, a substantially circular group of symbol wheels each carrying a row of different symbols on its peripheral cylindrical surface and extending substantially radially to said group, an electromagnetic mechanism associated with each of said wheels for adjusting it to a selected angular position, an impulse transmitting scanning device having a photo-cell arranged in the center of said group of wheels for scanning a circular line of symbols along an inner periphery of said group, said device being provided with drive means for rotating and axially displacing said cell so as to complete the scanning of said line in a given number of rotations, and a facsimile recorder synchronized with said drive and controlled by said scanning device for producing a record of the symbols of said line.

7. A recording system comprising, in combination, a substantially circular group of symbol wheels each carrying a row of different symbols on its peripheral cylinder surface and extending substantially radially to said group, an electromagnetic mechanism associated with each of said wheels for adjusting it to a selected angular position, an impulse transmitting scanning device having a photo-cell arranged coaxially to said group of wheels and a mirror for focusing said cell onto a circular line of symbols along an inner periphery of said group, said mirror being rotatable about the axis of said group and angularly displaceable about a pivot transverse to said axis, drive means forming part of said device for rotating and angularly displacing said mirror so as to scan said line during a given number of rotations, and a facsimile recorder synchronized with said drive and controlled by said scanning device for producing a record of the symbols of said line.

8. A recording system comprising, in combination, a substantially circular group of symbol wheels each carrying a row of different symbols on its peripheral cylinder surface and extending substantially radially to said group, an electromagnetic mechanism associated with each of said wheels for adjusting it to a selected angular position, an impulse transmitting scanning device having a light source and a photo-cell arranged near the center of said group of wheels, said light source being provided with means for illuminating a scanning point located on a circular series of symbols along an inner periphery of said wheel group and said photo-cell being positioned to react on reflected light of said scanning point, said device comprising drive means for rotating and axially displacing said photo-cell and light source so that said point scans said series of symbols during a given number of rotations, and a facsimile recorder synchronized with said drive and controlled by said scanning device for producing a record of the symbols of said line.

9. A recording system comprising, in combination, a group of juxtaposed indicating devices each having a rotary member provided with a row of different symbols and electric means for rotating said member so as to place a selected symbol into a reference position aligned with the respective reference positions of said other member, an electric impulse transmitting device having revolvable scanning means and a drive mechanism for imparting a spiral motion to said scanning means so as to scan said line of selected symbols during a multiple number of cycles of revolution of said scanning means, and facsimile recording means mechanically connected with said mechanism to operate in synchronism with said scanning means and electrically connected with the latter to be controlled by the electric impulse of said transmitting device.

10. A recording system comprising, in combination, a group of juxtaposed indicating devices each having a rotary member provided with a row of different symbols and electric means for rotating said member so as to place a selected symbol into a reference position aligned with the respective reference positions of said other member, an electric impulse transmitting device having revolvable scanning means and a drive mechanism for revolving said scanning means while displacing said means transversely thereof in order to scan said line during a given plurality of revolutions, and recording apparatus having stylus means synchronized with said revolution and a recording surface member synchronized with said transversal motion for producing an image of said line of symbols.

11. A transmitting apparatus for facsimile recorders, comprising a substantially circular group of symbol wheels each carrying a row of different symbols on its peripheral cylinder surface and extending substantially radially to said group, electric control means associated with each of said wheels for rotating it so as to place a selected symbol on the inner periphery of said wheel group, and photo-electric impulse transmitting means disposed substantially within said inner periphery for scanning the line of selected symbols.

12. A transmitting apparatus comprising a substantially circular group of symbol wheels each carrying a row of different symbols on its peripheral cylinder surface and extending substantially radially to said group, means associated with each of said wheels for adjusting it to a selected angular position, impulse transmitting means for scanning a line of symbols along an inner periphery of said group, drive means for rotating and angularly displacing said scanning means so as to scan said line during a given number of rotations and a circuit for controlling said drive means, said circuit containing contact means for energizing said drive means and a limit switch operative upon completion of said number of rotations to stop said drive means.

GEORGE KEINATH.